US012603110B2

(12) United States Patent
Miyamura et al.

(10) Patent No.: US 12,603,110 B2
(45) Date of Patent: Apr. 14, 2026

(54) MAGNETIC STORAGE MEDIA HAVING PARTITIONS WITHOUT GUARD WRAPS

(71) Applicant: International Business Machines Corporation, Armonk, NY (US)

(72) Inventors: Tsuyoshi Miyamura, Yokohama (JP); Atsushi Abe, Ebina (JP); Tohru Hasegawa, Tokyo (JP); Shinsuke Mitsuma, Machida (JP); Hiroshi Itagaki, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/814,211

(22) Filed: Aug. 23, 2024

(65) Prior Publication Data

US 2026/0057906 A1     Feb. 26, 2026

(51) Int. Cl.
*G11B 7/24094*        (2013.01)
*G11B 7/24009*        (2013.01)
G11B 7/24              (2013.01)

(52) U.S. Cl.
CPC ...... *G11B 7/24094* (2013.01); *G11B 7/24009* (2013.01); *G11B 2007/240017* (2013.01)

(58) Field of Classification Search
None
See application file for complete search history.

(56) References Cited

U.S. PATENT DOCUMENTS

| | | | | |
|---|---|---|---|---|
| 5,969,893 | A * | 10/1999 | Basham | ............. G11B 5/00817 |
| 9,236,065 | B2 | 1/2016 | Abe et al. | |
| 10,453,485 | B1 * | 10/2019 | Miyamura | ........... G11B 5/5504 |
| 11,176,964 | B1 * | 11/2021 | Hasegawa | .......... G11B 20/1201 |
| 11,222,659 | B1 | 1/2022 | Goker | |
| 2015/0055240 | A1 | 2/2015 | Iwanaga et al. | |
| 2015/0095566 | A1 * | 4/2015 | Itagaki | .................. G06F 3/0655 |
| | | | | 711/111 |
| 2016/0077757 | A1 * | 3/2016 | Hasegawa | ............... G06F 3/067 |
| | | | | 711/111 |
| 2017/0153823 | A1 * | 6/2017 | Hasegawa | ............. G06F 3/0608 |
| 2017/0249100 | A1 | 8/2017 | Kawamura et al. | |
| 2019/0214049 | A1 * | 7/2019 | Harper | ............... G11B 19/2009 |
| 2019/0304492 | A1 * | 10/2019 | Biskeborn | .......... G11B 5/00821 |
| 2019/0384715 | A1 * | 12/2019 | Miyamura | ......... G11B 5/00817 |
| 2022/0308758 | A1 * | 9/2022 | Itagaki | .................. G06F 3/0604 |
| 2022/0383897 | A1 * | 12/2022 | Kondo | .................. G06F 3/0644 |
| 2022/0413730 | A1 * | 12/2022 | Kondo | .................. G06F 3/0644 |
| 2025/0149061 | A1 * | 5/2025 | Iben | ..................... G11B 5/4893 |

OTHER PUBLICATIONS

Anonymous, "No Guard Wrap Partitioning," IP.com Prior Art Database, Technical Disclosure No. IPCOM000241453D, Apr. 30, 2015, 11 pages.
Muras, M., "Tape Storage: LTO and LTFS," Seminar Storage and Filesystems, Jun. 7, 2016, 19 pages, retrieved from https://wr. informatik.uni-hamburg.de/_media/teaching/sommersemester_2016/ sds16_muras_Ito-report.pdf.

* cited by examiner

*Primary Examiner* — William J Klimowicz
(74) *Attorney, Agent, or Firm* — Zilka-Kotab, P.C.

(57) ABSTRACT

In one general embodiment, a method includes partitioning a magnetic recording tape having a plurality of data bands. The partitioning includes assigning no more than two wraps of a first of the data bands to an index partition, the two wraps being at an end of wraps of the first data band, and assigning all other wraps of the first data band to a data partition. No guard wraps between the index partition and the data partition are assigned.

20 Claims, 17 Drawing Sheets

100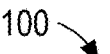

COMPUTER 101

PROCESSOR SET 110

PROCESSING CIRCUITRY 120       CACHE 121

COMMUNICATION FABRIC 111

VOLATILE MEMORY 112

PERSISTENT STORAGE 113

OPERATING SYSTEM 122

FILE SYSTEM CODE

200

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

1302 — Assign no more than two wraps of a first of the data bands to an index partition, the two wraps being at an end of wraps of the first data band 1304 — Assign all other wraps of the first data band to a data partition, no guard wraps are assigned between the index partition and the data partition Partition 0

Partition 1

Partition 0

1400 wrap 0
wrap 2
wrap 4
wrap 6
wrap 8
wrap 9
wrap 7
wrap 5
wrap 3
wrap 1

1700

1702    Receive a command to unmount a file system

1704    Determine whether data in a data partition on a magnetic recording tape has changed 1706    Write index in the data partition 1708    Locate a beginning of partition of the index partition 1710    Write the index in the index partition in a direction away from the beginning of partition 1802 — Unmount LTFS 1804 — Is meta data changed?

No

1800

Yes

1806 — Write index on DP

1808 — Locate BOP on IP

1810 — Write VOL1 Label, FM, LTFS Label, FM

1812 — Write ruled records if necessary

1814 — Write FM, index on IP, FM

1816 — Unload the tape

1900

File Mark

| VOL1 Label | LTFS Label | Rules records | Index | |

MAGNETIC STORAGE MEDIA HAVING PARTITIONS WITHOUT GUARD WRAPS

BACKGROUND

The present invention relates to data storage systems, and more particularly, this invention relates to use of magnetic storage media having partitions with no guard wraps.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various challenges ranging from the design of tape head assemblies for use in such systems to dealing with tape dimensional instability.

SUMMARY

A method, in accordance with one embodiment, includes partitioning a magnetic recording tape having a plurality of data bands. The partitioning includes assigning no more than two wraps of a first of the data bands to an index partition, the two wraps being at an end of wraps of the first data band, and assigning all other wraps of the first data band to a data partition. No guard wraps between the index partition and the data partition are assigned.

An apparatus, in accordance with one embodiment, includes a magnetic head, a drive mechanism for passing a magnetic recording tape over the magnetic head, and a controller electrically coupled to the magnetic head. The controller is configured to cause the apparatus to perform operations that include partitioning a magnetic recording tape having a plurality of data band. The partitioning includes assigning no more than two wraps of a first of the data bands to an index partition, the two wraps being at an end of wraps of the first data band, and assigning all other wraps of the first data band to a data partition. No guard wraps are assigned between the index partition and the data partition.

A method, in accordance with one embodiment, includes receiving a command to unmount a file system used with a magnetic recording tape having no guard wraps between an index partition and a data partition on a magnetic recording tape. A determination is made as to whether data in the data partition has changed. In response to determining that the data has changed, an index is written in the data partition. A beginning of partition of the index partition is located. The index is written in the index partition in a direction away from the beginning of partition.

Any of these embodiments may be implemented in a magnetic data storage system such as a tape drive apparatus, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment of the present invention.

3

Figures 18, 19:
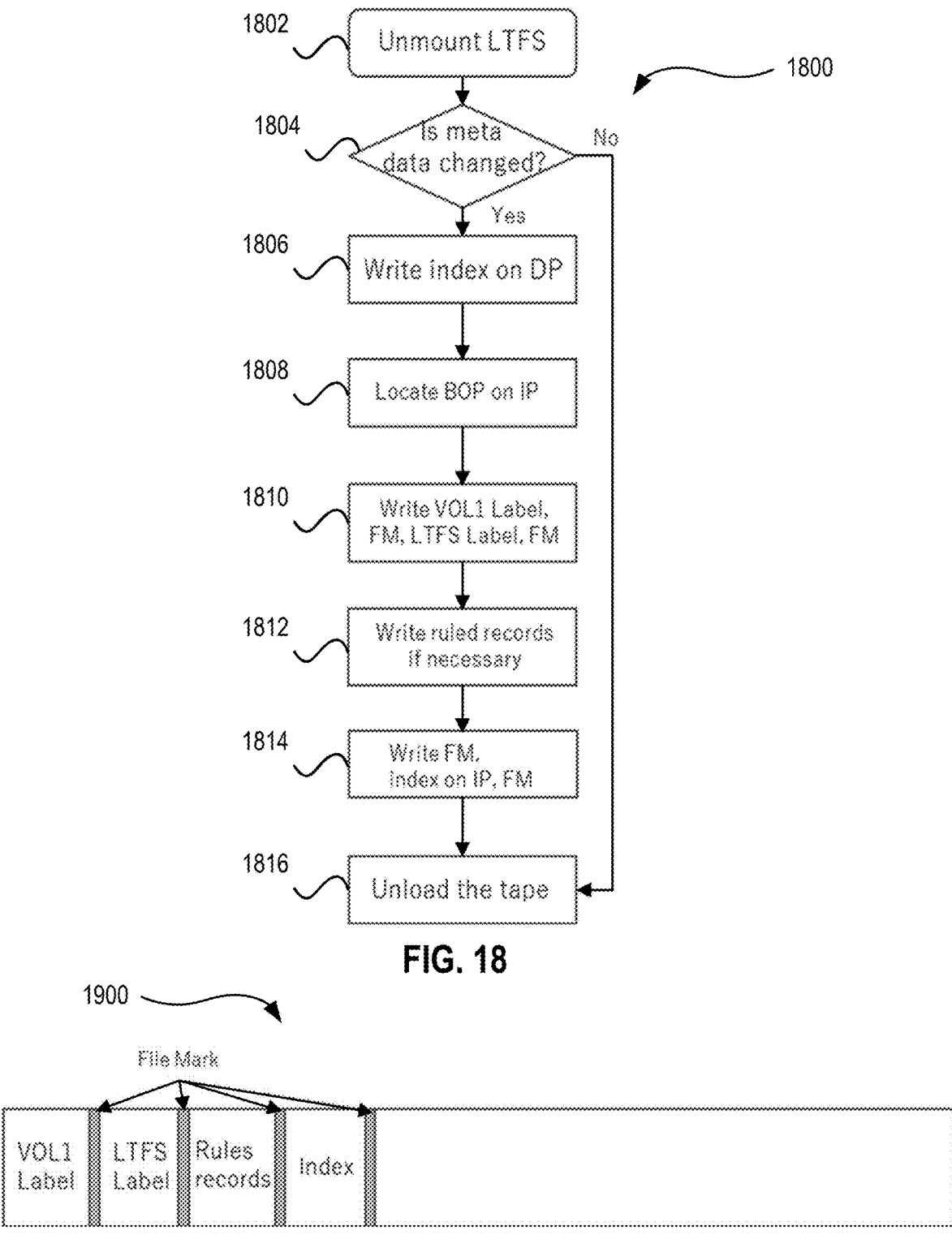

FIG. 18 is a flowchart of a method, in accordance with one embodiment.

FIG. 19 is a is a conceptual diagram illustrating an index partition, in accordance with one embodiment.

Figure 20:
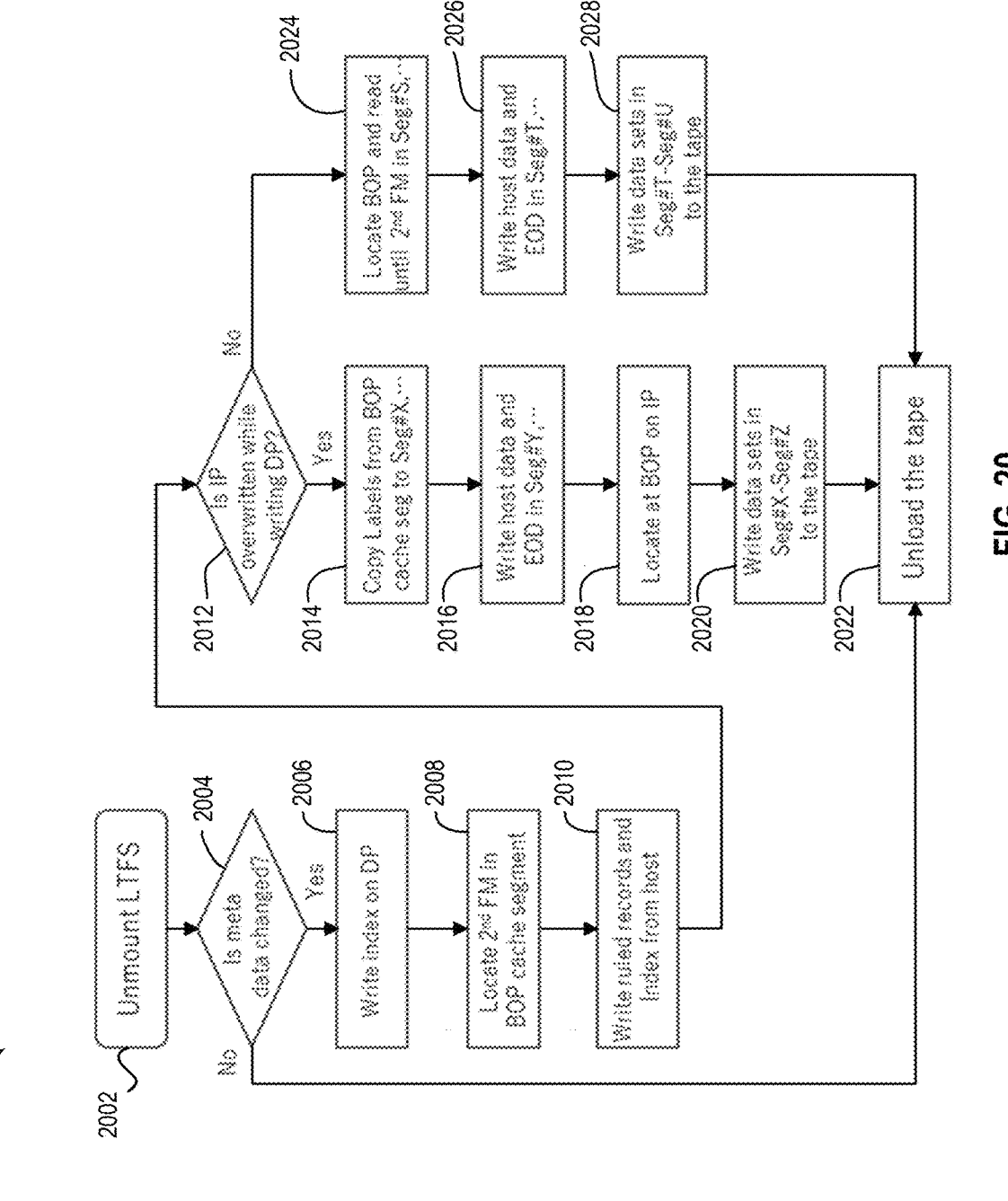

FIG. 20 is a flowchart of a method, in accordance with one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic recording media and magnetic storage systems, as well as operation and/or component parts thereof.

In one general embodiment, a method includes partitioning a magnetic recording tape having a plurality of data bands. The partitioning includes assigning no more than two wraps of a first of the data bands to an index partition, the two wraps being at an end of wraps of the first data band, and assigning all other wraps of the first data band to a data partition. No guard wraps between the index partition and the data partition are assigned.

In another general embodiment, an apparatus includes a magnetic head, a drive mechanism for passing a magnetic recording tape over the magnetic head, and a controller electrically coupled to the magnetic head. The controller is configured to cause the apparatus to perform operations that include partitioning a magnetic recording tape having a plurality of data band. The partitioning includes assigning no more than two wraps of a first of the data bands to an index partition, the two wraps being at an end of wraps of the first data band, and assigning all other wraps of the first data band to a data partition. No guard wraps are assigned between the index partition and the data partition.

In another general embodiment, a method includes receiving a command to unmount a file system used with a magnetic recording tape having no guard wraps between an index partition and a data partition on a magnetic recording tape. A determination is made as to whether data in the data partition has changed. In response to determining that the data has changed, an index is written in the data partition. A beginning of partition of the index partition is located. The index is written in the index partition in a direction away from the beginning of partition.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved file system code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 2A:
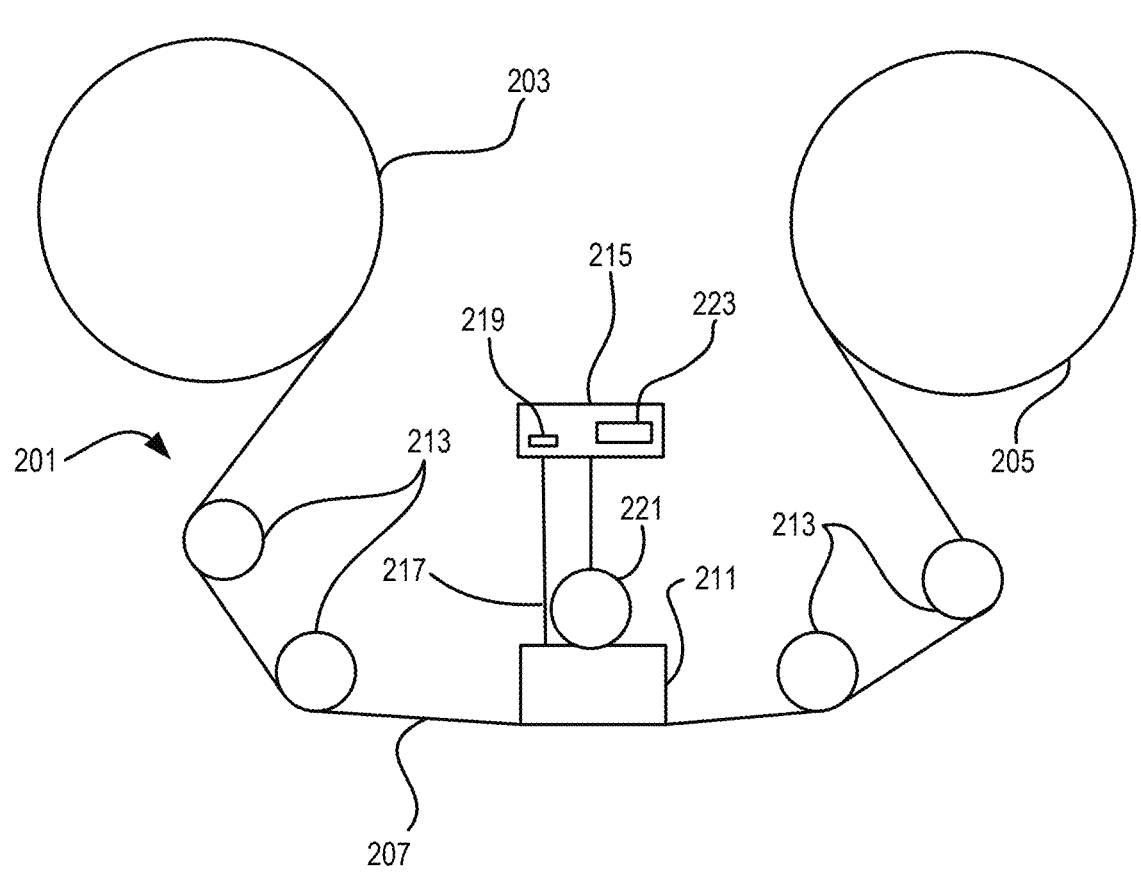
FIG. 2A is a schematic diagram of a simplified tape drive system, in accordance with one embodiment.

FIG. 2A illustrates a simplified tape drive 201 of a tape-based data storage system, which may be employed in the context of the present invention. While one specific implementation of a tape drive is shown in FIG. 2A, it should be noted that the embodiments described herein may be implemented in the context of any type of tape drive system.

As shown, a tape supply cartridge 203 and a take-up reel 205 are provided to support a tape 207. One or more of the reels may form part of a removable cartridge and are not necessarily part of the tape drive 201. The tape drive, such as that illustrated in FIG. 2A, may further include drive motor(s) to drive the tape supply cartridge 203 and the take-up reel 205 to move the tape 207 over a tape head 211 of any type. Such head may include an array of read transducers (also referred to as readers), write transducers (also known in the art as writers), or both.

Guides 213 guide the tape 207 across the tape head 211. Such tape head 211 is in turn coupled to a controller 215 via a cable 217. The controller 215, may be or include a processor and/or any logic for controlling any subsystem of the drive 201. For example, the controller 215 typically controls head functions such as servo following, data writing, data reading, etc. The controller 215 may include at least one servo channel and at least one data channel, each of which include data flow processing logic configured to process and/or store information to be written to and/or read from the tape 207. The controller 215 may operate under logic known in the art, as well as any logic disclosed herein, and thus may be considered as a processor for any of the descriptions of tape drives included herein, in various embodiments. The controller 215 may be coupled to a memory 219 of any known type, which may store instructions executable by the controller 215. Moreover, the controller 215 may be configured and/or programmable to perform or control some or all of the methodology presented herein. Thus, the controller 215 may be considered to be configured to perform various operations by way of logic programmed into one or more chips, modules, and/or blocks; software, firmware, and/or other instructions being available to one or more processors; etc., and combinations thereof.

The cable 217 may include read/write circuits to transmit data to the tape head 211 to be recorded on the tape 207 and to receive data read by the tape head 211 from the tape 207. An actuator 221 controls position of the tape head 211 relative to the tape 207.

An interface 223 may also be provided for communication between the tape drive 201 and a host (internal or external) to send and receive the data and for controlling the operation of the tape drive 201 and communicating the status of the tape drive 201 to the host, all as will be understood by those of skill in the art.

Figure 2B:
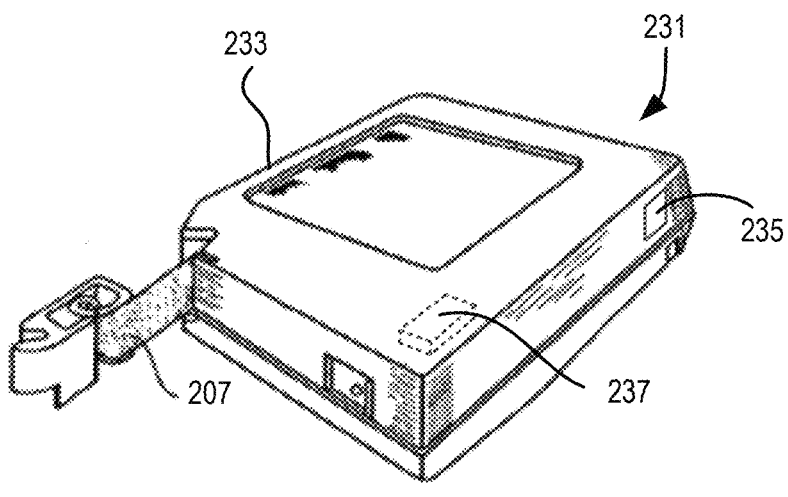
FIG. 2B is a schematic diagram of a tape cartridge, in accordance with one embodiment.

FIG. 2B illustrates an exemplary tape cartridge 231, according to one embodiment. Such tape cartridge 231 may be used with a system such as that shown in FIG. 2A. As shown, the tape cartridge 231 includes a housing 233, a tape

207 in the housing 233, and a nonvolatile memory 237 coupled to the housing 233. In some approaches, the nonvolatile memory 237 may be embedded inside the housing 233, as shown in FIG. 2B. In more approaches, the nonvolatile memory 237 may be attached to the inside or outside of the housing 233 without modification of the housing 233. For example, the nonvolatile memory may be embedded in a self-adhesive label 235. In one preferred embodiment, the nonvolatile memory 237 may be a Flash memory device, read-only memory (ROM) device, etc., embedded into or coupled to the inside or outside of the tape cartridge 231. The nonvolatile memory is accessible by the tape drive and the tape operating software (the driver software), and/or another device.

Figure 2C:
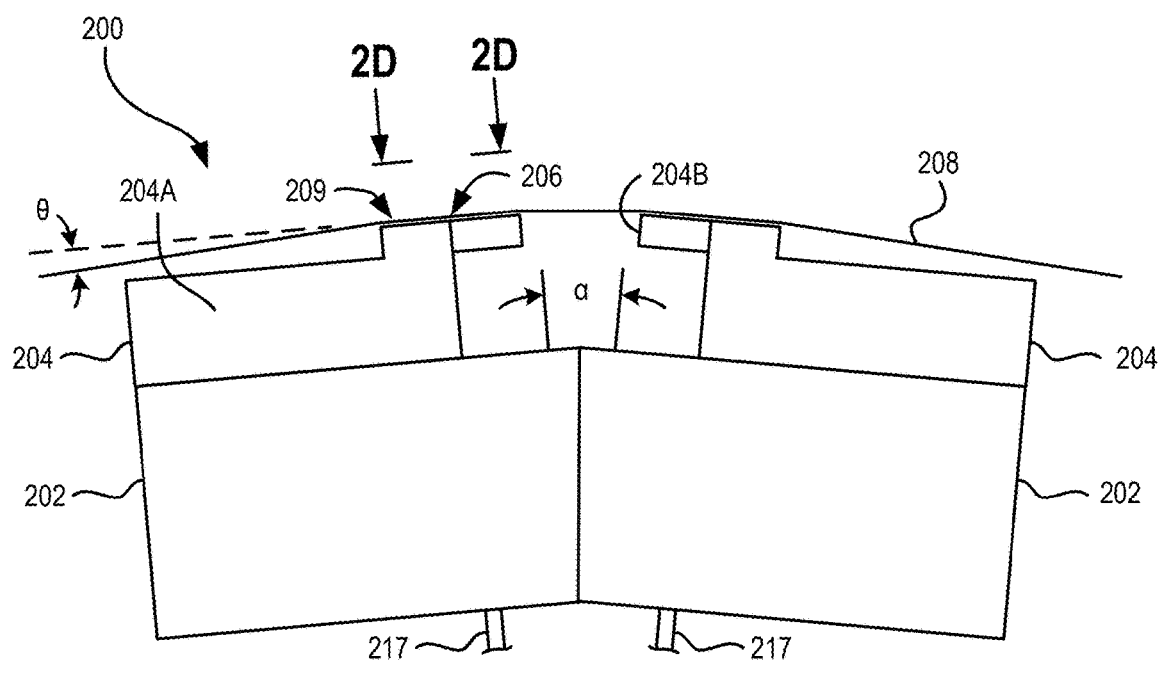
FIG. 2C illustrates a side view of a flat-lapped, bi-directional, two-module magnetic tape head, in accordance with one embodiment.

By way of example, FIG. 2C illustrates a side view of a flat-lapped, bi-directional, two-module magnetic tape head 211 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the read transducers and/or write transducers 206 are formed. In use, a tape 208 is moved over the modules 204 along a media (tape) bearing surface 209 in the manner shown for reading and writing data on the tape 208 using the read transducers and write transducers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

Cables 217 are provided for enabling communication between the controller and the transducers 206 of each of the modules 204. Pads on a cable 217 are typically wire bonded to pads on the associated module 204.

The read transducers and write transducers may be arranged in a piggyback or merged configuration. An illustrative piggybacked configuration comprises a (magnetically inductive) write transducer on top of (or below) a (magnetically shielded) read transducer (e.g., a magnetoresistive reader, etc.), wherein the poles of the write transducer and the shields of the read transducer are generally separated. An illustrative merged configuration comprises one reader shield in the same physical layer as one writer pole (hence, "merged"). The read transducers and write transducers may also be arranged in an interleaved configuration. Alternatively, each array of channels may be read transducers or write transducers only. Any of these arrays may contain one or more servo readers for reading servo data on the medium.

Figure 2D:
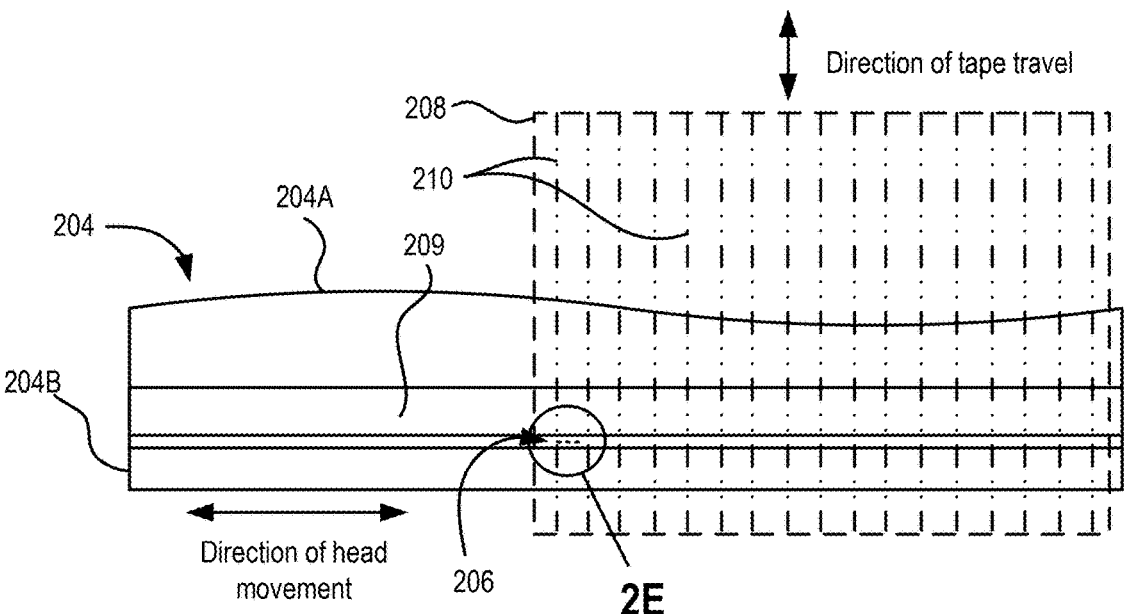
FIG. 2D is a tape bearing surface view taken from Line 2D of FIG. 2C.

FIG. 2D illustrates the tape bearing surface 209 of one of the modules 204 taken from Line 2D of FIG. 2C. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2D on a one-half inch wide tape 208. The data bands are defined between servo tracks 210. Each data band may include a number of data tracks, for example 1024 data tracks (not shown). During read/write operations, the read transducers and/or write transducers 206 are positioned to specific track positions within one of the data bands. Outer readers, sometimes called servo readers, read the servo tracks 210. The servo signals are in turn used in a conventional manner to keep the read transducers and/or write transducers 206 aligned with a particular set of tracks during the read/write operations.

Figures 2E, 2F:
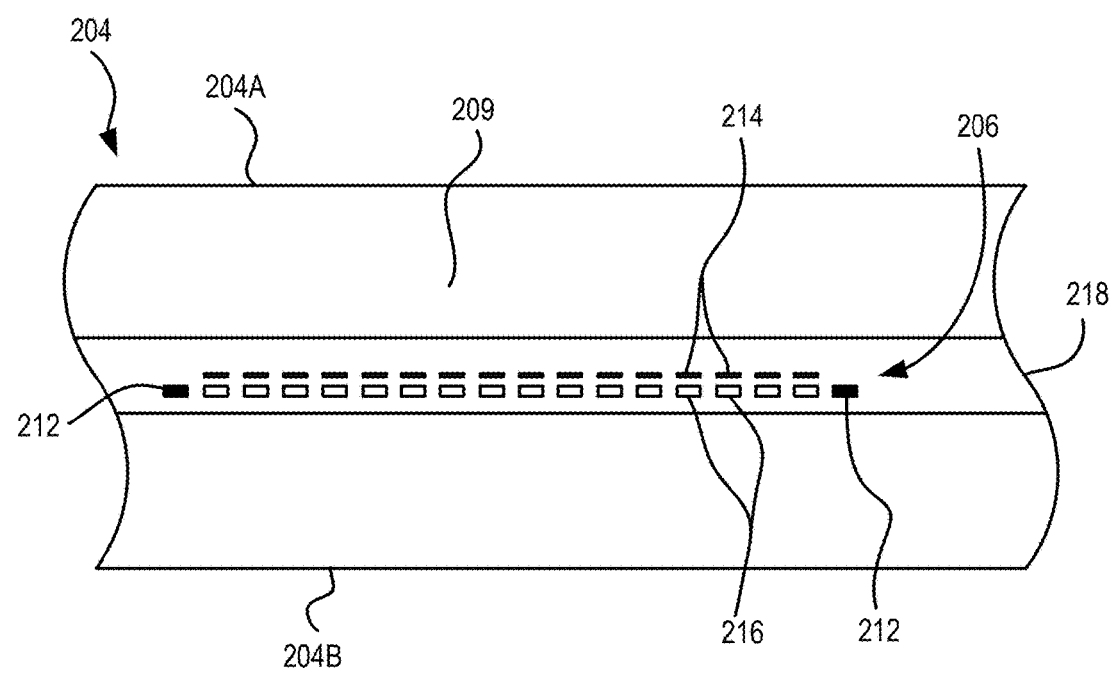
FIG. 2E is a detailed view taken from Circle 2E of FIG. 2D.
FIG. 2F is a detailed view of a partial tape bearing surface of a pair of modules.

FIG. 2E depicts a plurality of read transducers and/or write transducers 206 formed in a gap 218 on the module 204 in Circle 2E of FIG. 2D. As shown in FIG. 2E, the array of read transducers and write transducers 206 includes, for example, 16 write transducers 214, 16 read transducers 216 and two servo readers 212, though the number of elements may vary. Illustrative embodiments include 8, 16, 32, 40, and 64 active read transducers and/or write transducers 206 per array, and alternatively interleaved designs having odd numbers of read transducers or write transducers such as 17, 25, 33, etc. An illustrative embodiment includes 32 read transducers per array and/or 32 write transducers per array, where the actual number of transducer elements could be greater, e.g., 33, 34, etc. Multiple simultaneously-operated transducers allow the tape to travel at a modest velocity while maintaining a high data transfer rate. Lower velocities are desirable to reduce mechanical difficulties from speed-induced tracking.

While the read transducers and write transducers may be arranged in a piggyback configuration as shown in FIG. 2E, the read transducers 216 and write transducers 214 may also be arranged in an interleaved configuration. Alternatively, each array of read transducers and/or write transducers 206 may be read transducers or write transducers only, and the arrays may contain one or more servo readers 212. As noted by considering FIGS. 2C and 2D-2E together, each module 204 may include a complementary set of read transducers and/or write transducers 206 for such things as bi-directional reading and writing, read-while-write capability, backward compatibility, etc.

FIG. 2F shows a partial tape bearing surface view of complementary modules of a magnetic tape head 211, according to one embodiment. In this embodiment, each module has a plurality of read/write (R/W) pairs in a piggyback configuration formed on a common substrate 204A and an optional electrically insulative insulating layer 236. The write transducers 214 and the read transducers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 211 operate in a transducing relationship in the manner well-known in the art. The head assembly 211 includes two thin-film modules 224 and 226 of generally identical construction.

Modules 224 and 226 are joined together with a space present between closures 204B thereof (partially shown) to form a single physical unit to provide read-while-write capability by activating the write transducer of the leading module and read transducer of the trailing module aligned with the write transducer of the leading module parallel to the direction of tape travel relative thereto. When a module 224, 226 of a magnetic tape head 211 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (e.g., ~80/20 at % NiFe, also known as permalloy), cobalt zirconium tantalum (CZT) or Al—Fe—Si (Sendust), a sensor 234 for sensing a data track on a magnetic medium, a second shield 238 typically of a nickel-iron alloy (e.g., permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as CoFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
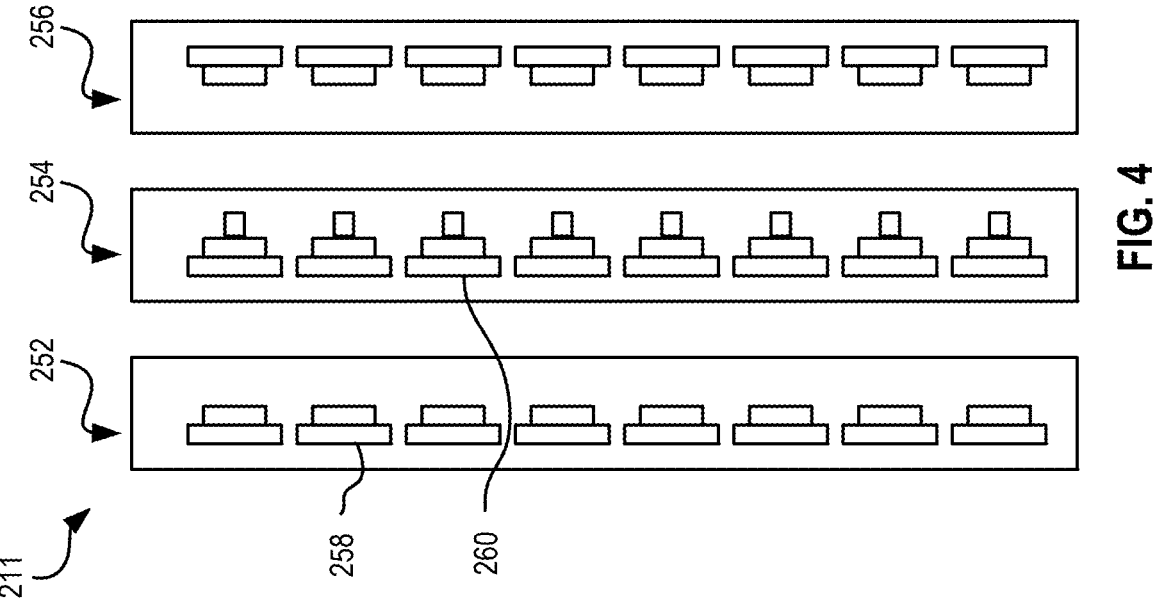
FIG. 4 is a partial tape bearing surface view of a magnetic head having a read-write-read configuration, in accordance with one embodiment.
Figure 3:
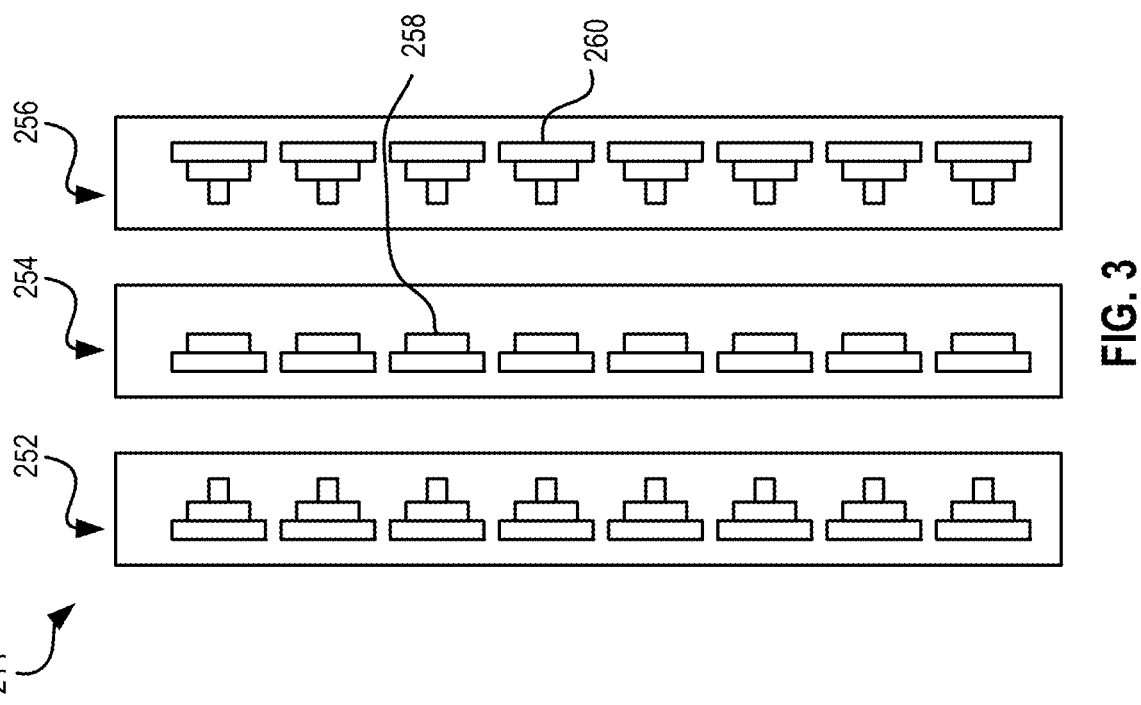
FIG. 3 is a partial tape bearing surface view of a magnetic head having a write-read-write configuration, in accordance with one embodiment.

The configuration of the tape head 211, according to one embodiment, includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of write transducers 260. The inner module 254 of FIG. 3 includes one or more arrays of read transducers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
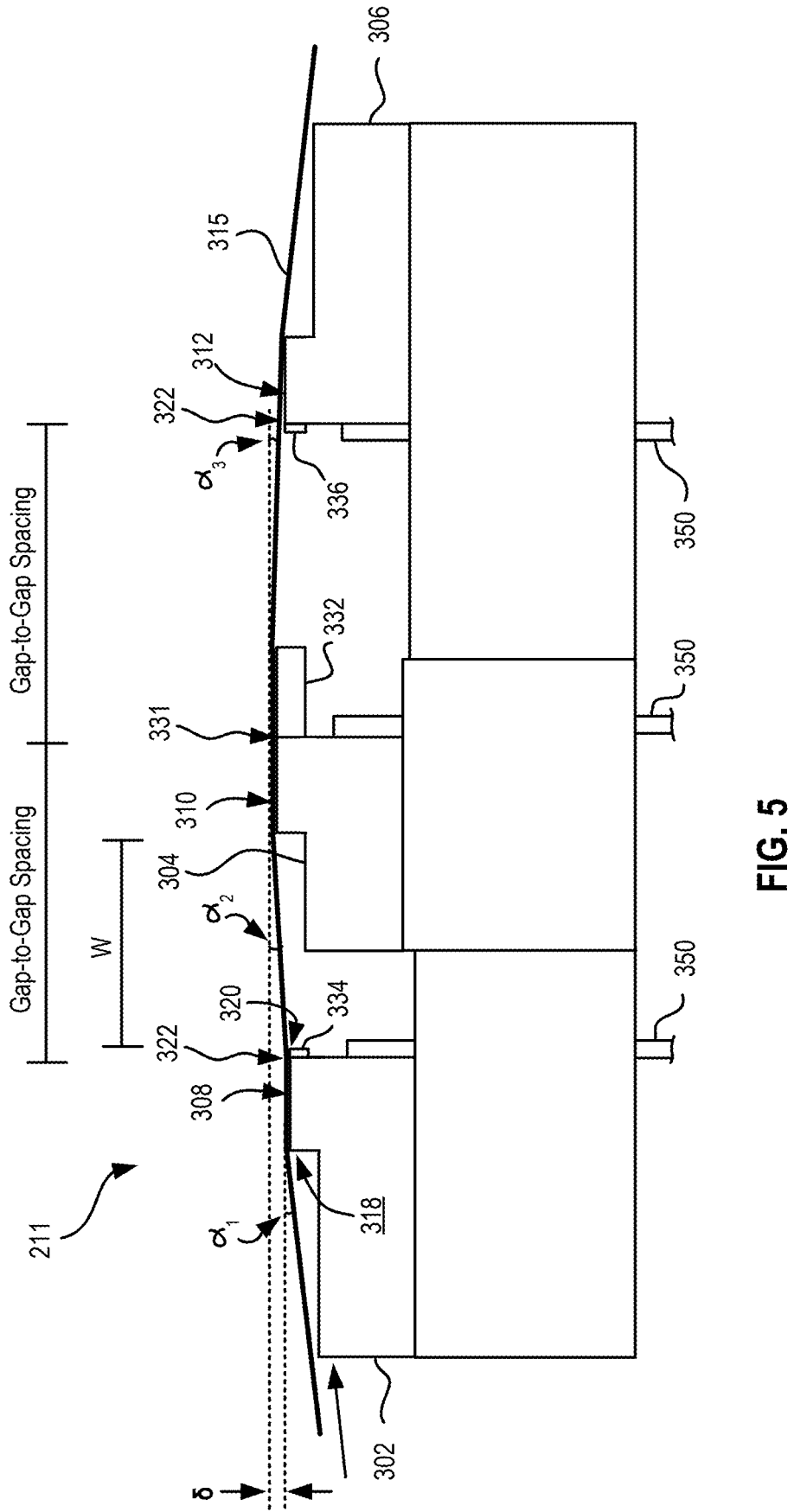
FIG. 5 is a side view of a magnetic tape head with three modules where the modules all generally lie along about parallel planes, in accordance with one embodiment.

FIG. 5 illustrates a magnetic head 211 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
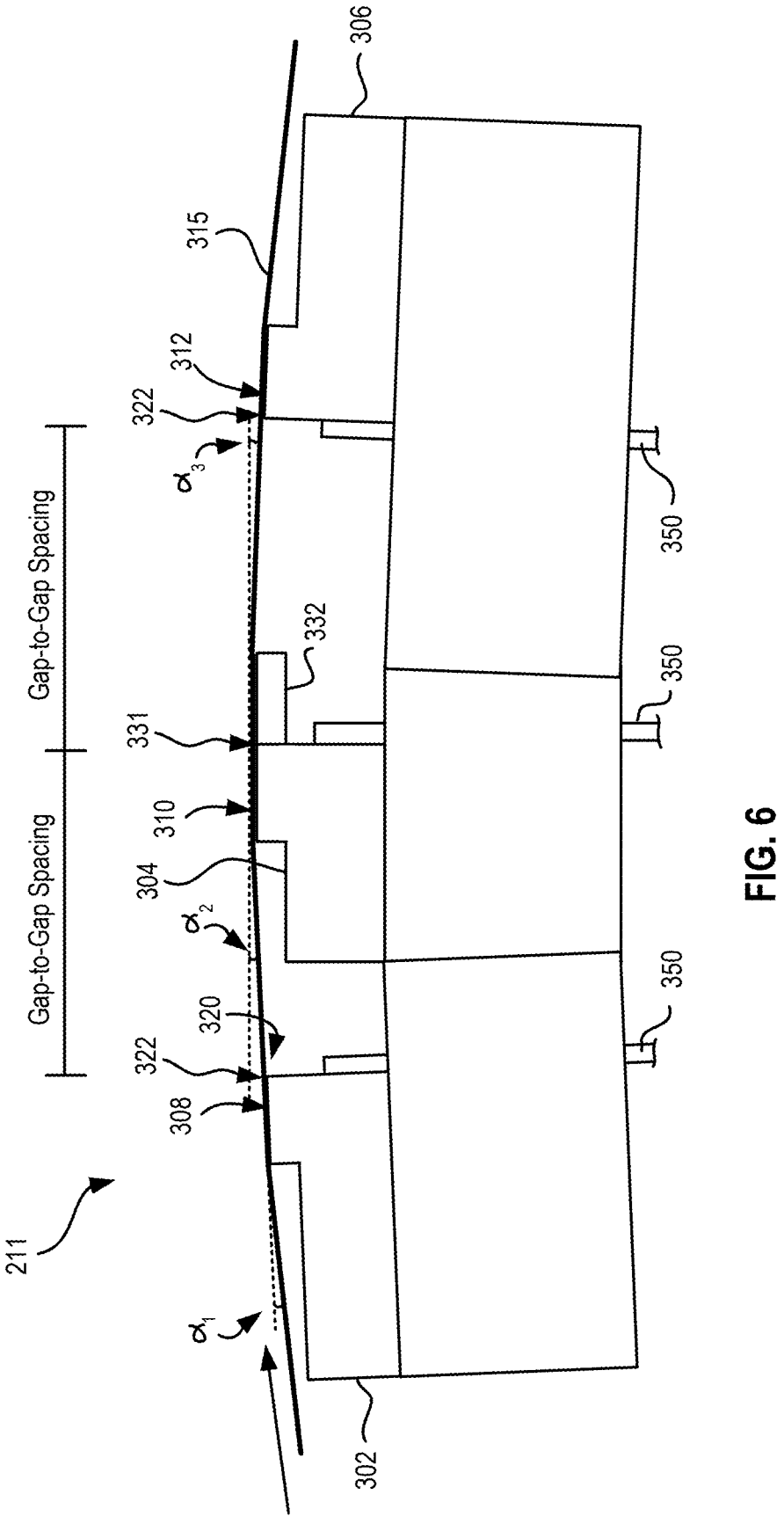
FIG. 6 is a side view of a magnetic tape head with three modules in a tangent (angled) configuration, in accordance with one embodiment.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1} (\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no write transducers. The first and third modules 302, 306 include a plurality of write transducers 322 and no data read transducers, with the exception that the outer modules 302, 306 may include optional servo readers. The servo readers may be used to position the head during reading and/or writing operations. The servo reader(s) on each module are typically located towards the end of the array of read transducers or write transducers.

By having only read transducers or side by side write transducers and servo readers in the gap between the substrate and closure, the gap length can be substantially reduced. Typical heads have piggybacked read transducers and write transducers, where the write transducer is formed above each read transducer. A typical gap is 20-35 microns. However, irregularities on the tape may tend to droop into the gap and create gap erosion. Thus, the smaller the gap the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
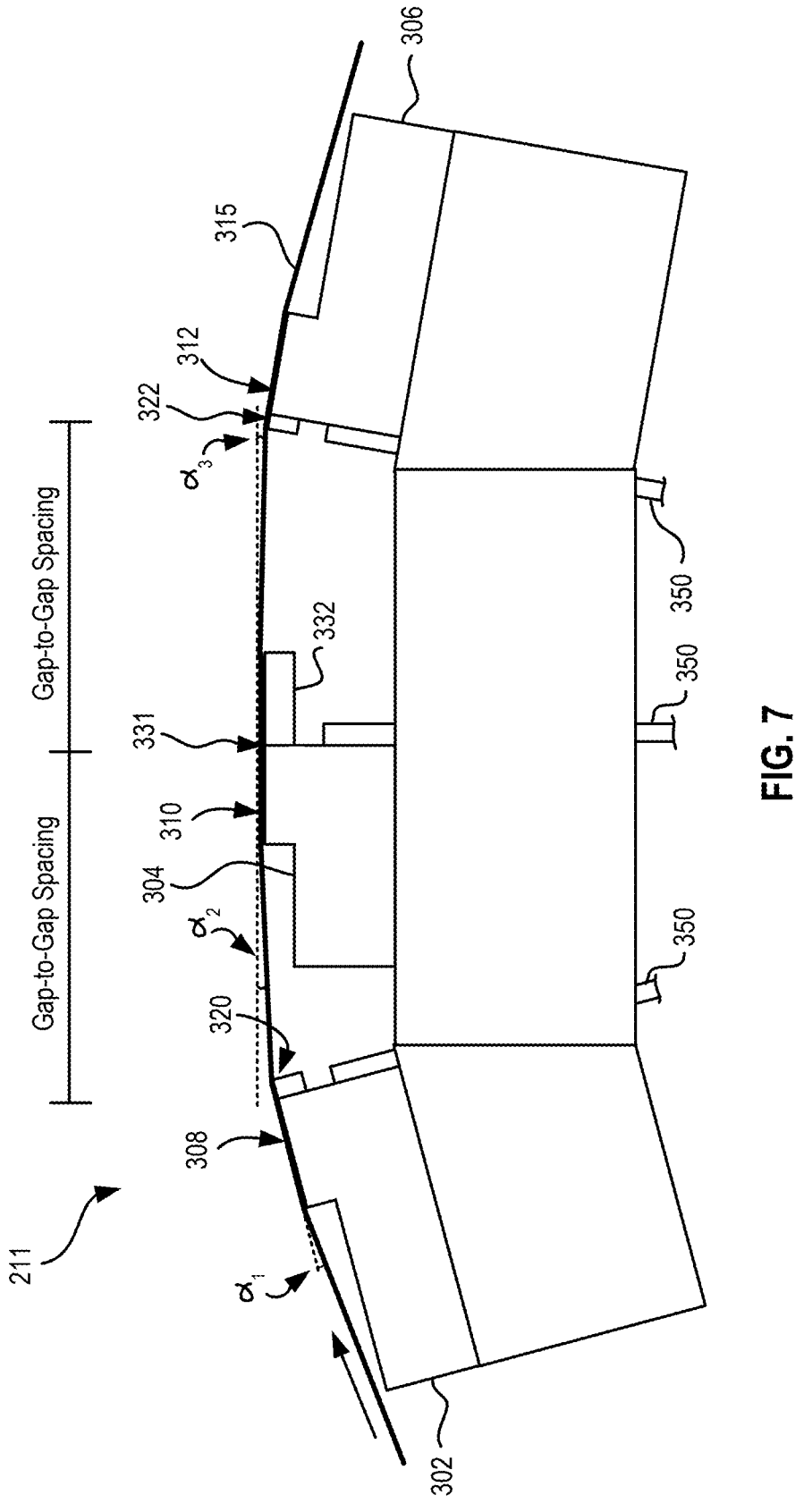
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module tape head 211 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the write transducers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
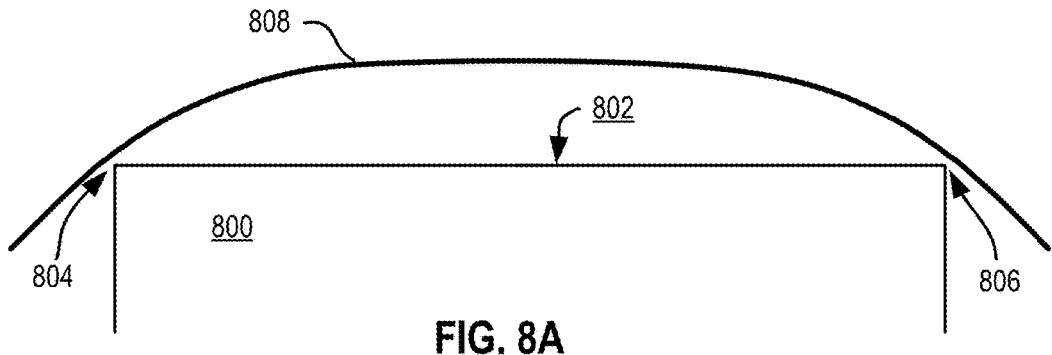
FIGS. 8A-8C are schematics depicting the principles of tape tenting.
Figure 8B:
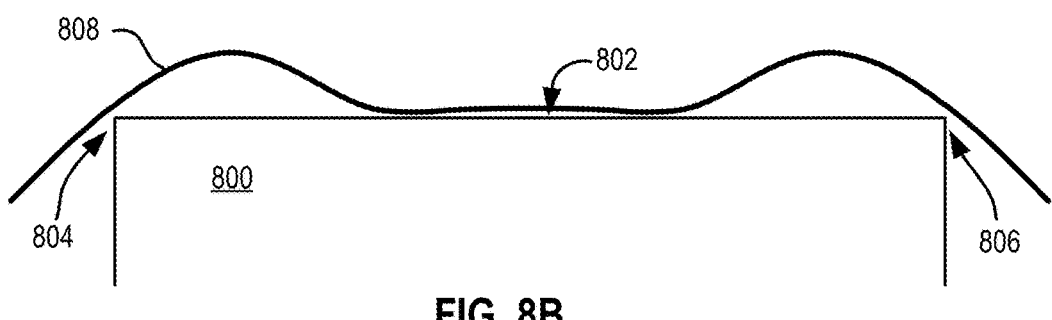
Figure 8C:
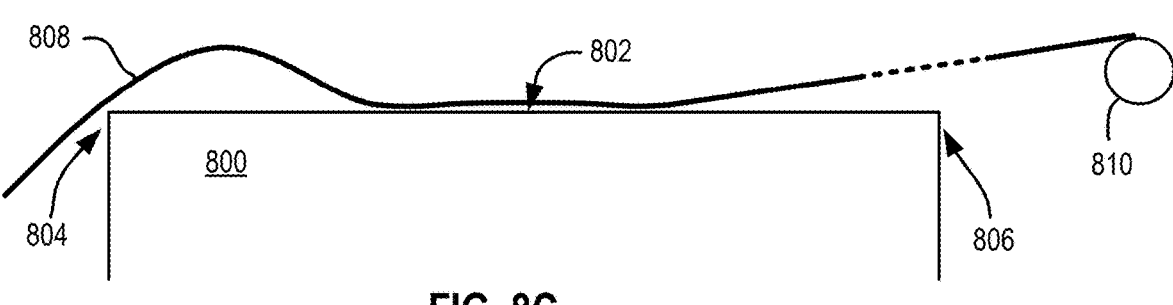

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enable access to compliant tapes. It should be appreciated that various embodiments herein can be implemented with a wide range of file system formats, including for example IBM® Spectrum® Archive Library Edition (LTFS LE) (IBM and all IBM-based trademarks and logos are trademarks or registered trademarks of International Business Machines Corporation and/or its affiliates). However, to provide a context, and solely to assist the reader, some of the embodiments below may be described with reference to LTFS, which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 205 of FIG. 2A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
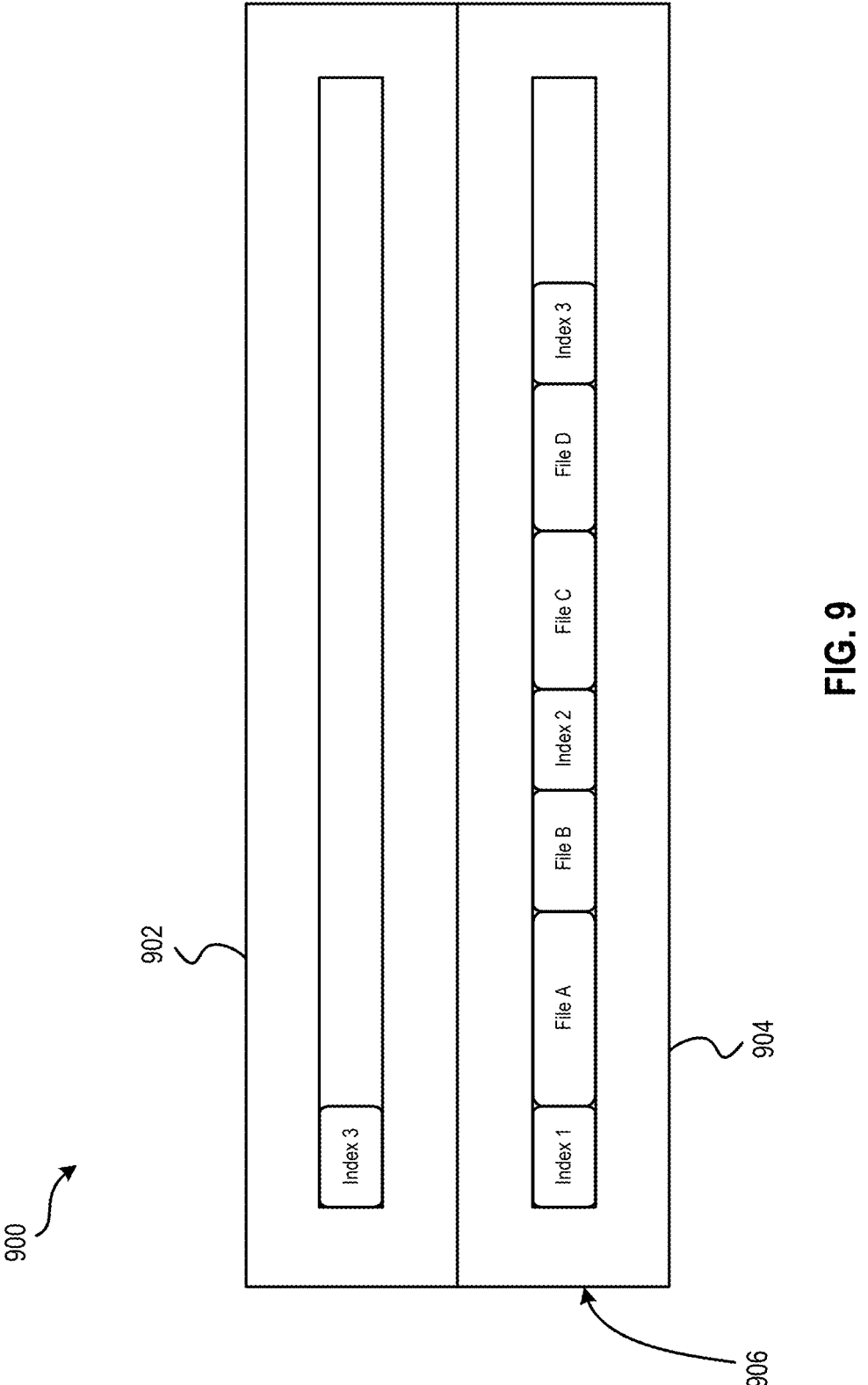
FIG. 9 is a representational diagram of files and indexes stored on a magnetic tape, in accordance with one embodiment.

Looking to FIG. 9, a magnetic tape 900 having an index partition 902 and a data partition 904 is illustrated, according to one embodiment. As shown, data files and indexes are stored on the tape. The data that makes up a data file is written to the data partition 904. The index file created in the index partition 902 and the data partition 904 stores file system meta information such as file names, locations on the data partition where the files are recorded, sizes, etc. This allows the data on the tape to be treated as a file on the file system. The LTFS format allows for index information to be recorded in the index partition 902 at the beginning of tape 906, thereby making it more readily accessible than the index information stored in the data partition 904.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three versions of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As noted above with reference to FIG. 2D, a magnetic recording tape is typically divided into multiple data bands, each band having a number of data tracks in which data is recorded along the length direction of the tape.

Conceptually, a tape drive divides the width of the tape into multiple areas (wraps) and records data in the length direction of the tape from the beginning to the end of the tape and from the end to the beginning for each wrap. The area in the tape width direction where valid data for each wrap is written is called a data track.

Figure 10:
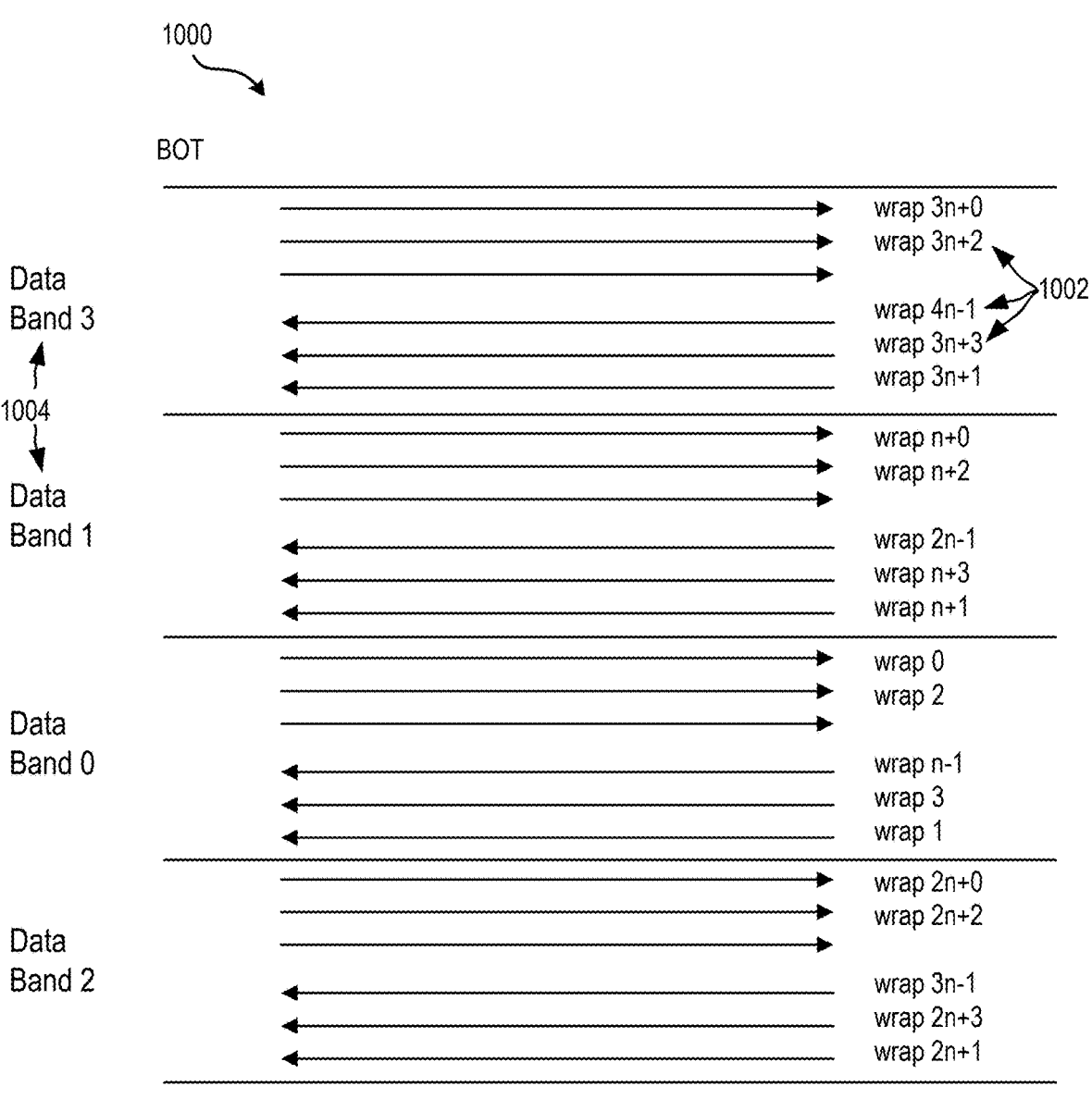
FIG. 10 is a conceptual diagram illustrating an exemplary general layout of wraps within data bands on a magnetic recording tape, in accordance with one embodiment.

FIG. 10 illustrates an exemplary general layout of wraps 1002 within data bands 1004 on a magnetic recording tape 1000. As shown in FIG. 10, in even numbered wraps, recording is performed on the track while traveling from the beginning of tape (BOT) to the end of tape (forward direction). In odd numbered wraps, recording is performed while traveling from the end to the BOT (backward direction).

As new generations of tape drives become available, data track widths ($W_T$) become narrower in order to write larger amounts of data. In preferred embodiments, the width ($W_R$) of each data reader is made narrower than the track width ($W_T$) so that data can be read even if the position of the head is slightly deviated during reading. In contrast, the width ($W_W$) of each data writer is typically much larger than the data track width ($W_T$). However, the data track width ($W_T$) may be controlled via shingling of conventional type, where a writer overwrites a portion of a previously-written data track, thereby defining the width of the previously-written data track as the portion of the previously-written data track remaining. In the exemplary layout of FIG. 10, recording is performed on the center side of the write area, that is, in an even number wrap (forward), a track is written on the lower side of the track width, and in an odd number wrap (backward), a track is written so as to protrude to the upper side of the track width. A portion of that track is overwritten by the writing of the next wrap via shingling.

Figures 11, 12:
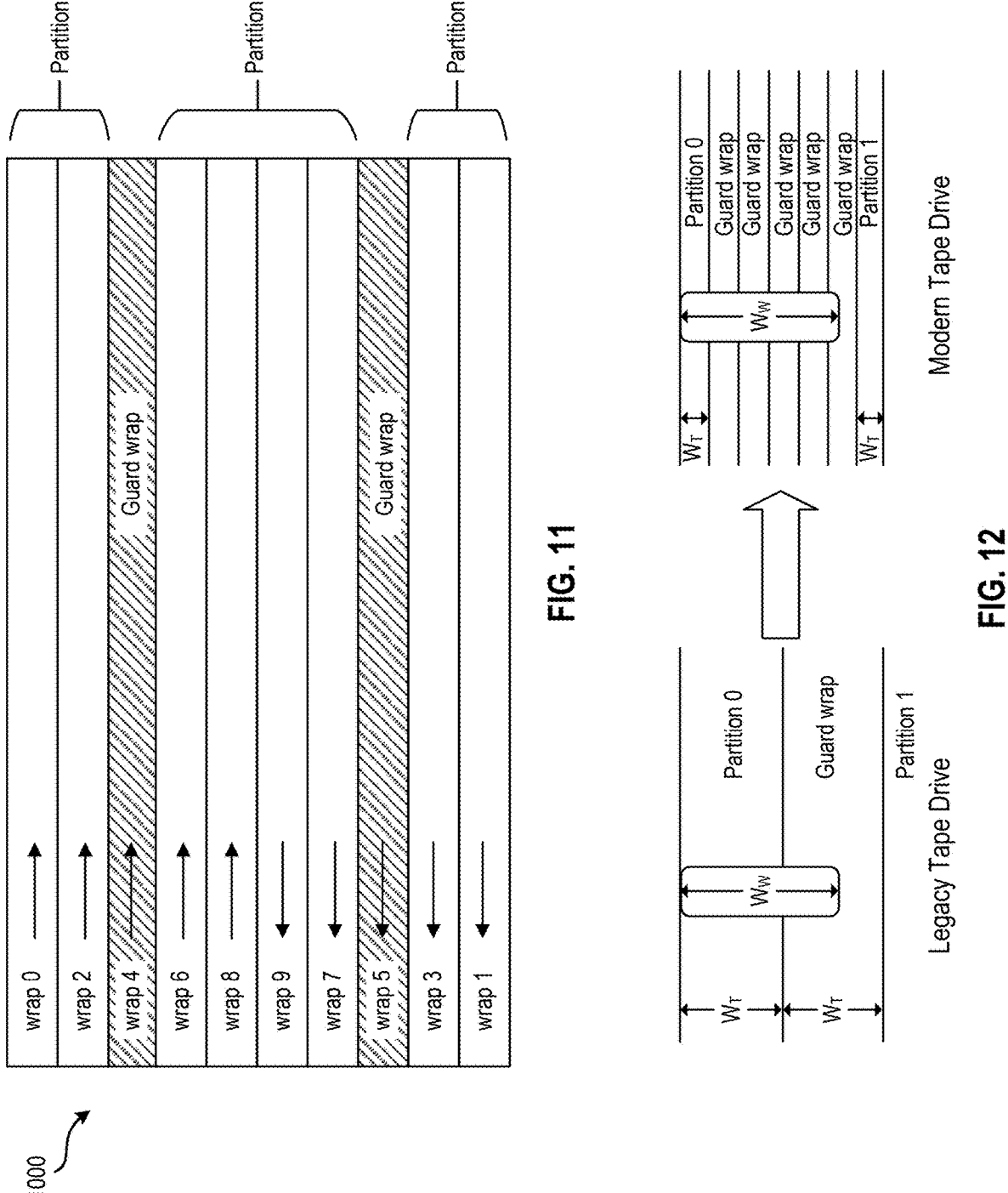
FIG. 11 is a conceptual diagram illustrating an exemplary layout of wraps within a data band on a magnetic recording tape.
FIG. 12 is a conceptual diagram depicting the transition from wider track widths to narrower track widths.

In some embodiments, tape drives may support partitioning, which allows a single tape to appear as multiple tapes. For example, assume a tape 1000 has ten wraps, as shown in FIG. 11, and one wants to create two partitions of the same size. Assume that there is a relationship in which the writer width ($W_W$) minus the track width ($W_T$) is less than the track width ($W_T$), that is, only one wrap is overwritten by shingling. In this case, wrap 0 to wrap 3 is partition 0, and wrap 6 to wrap 9 is partition 1. Wrap 4 and wrap 5 are reserved as guard wraps to protect the data recorded in the wrap of partition 1 from being overwritten by shingling when writing to the wrap of partition 0.

FIG. 12 depicts the transition from wider track widths to narrower track widths. Previously, as shown on the left in FIG. 12, the width ($W_W$) of a writer was about 1.5 times $W_T$ in older tape drives, so the number of guard wraps per partition was sufficient to be two wraps: one wrap each for even-numbered wraps and one wrap for odd-numbered wraps. However, to support larger-capacity tapes, in which $W_T$ has become relatively much narrower, it would be ideal if $W_W$ could also become relatively more narrow. This has proven difficult to achieve, and thus, further reductions in $W_W$ are unlikely. Accordingly, in the case of a modern tape drive having a much narrower track width ($W_T$), $W_W$ may be more than five times the track width ($W_T$), as shown in the example on the right in FIG. 12. Therefore, it would be necessary to secure a total of 10 wraps in both directions as guard wraps between partitions. This would be undesirable, in that the many guard wraps occupy space that could otherwise be used to store data; thus, capacity on the tape is not maximized.

As noted above with reference to FIG. 9, LTFS is able to divide a given space on a tape into two partitions: a data partition and an index partition. LTFS currently creates two partitions by dividing the first two wraps from the remaining wraps. A total of 12 wraps (two wraps for the index partition and ten wraps for the guard wrap) are reserved for metadata. By way of example, for a tape that can record 50 terabytes (TB) of data with 592 wraps, LTFS uses 50 [TB]÷592 [wrap]×12 [wrap]=1.013 [TB] to secure the index partition.

In future tape drives, it is expected that track width ($W_T$) will become even narrower than current track widths, but the writer width ($W_W$) may become wider than it is currently, so, in such an eventuality, even more capacity would be used to create index partitions with a file system such as LTFS.

Various embodiments described herein provide a partitioning mechanism that minimizes the reduction in data capacity from guard wraps, by employing a unique allocation of index partition and data partition. This mechanism enables an increase of more than 1 TB of data to be written to the exemplary 50 TB tape medium described above. In addition, various embodiments provide a unique mechanism to write an index partition on a tape medium. This enables an increase in the number of wraps that can be allocated to the data partition.

In one general embodiment, the last few wraps, ideally the last one or two wraps, of an arbitrary data band (any one of the data bands) are allocated to the index partition. The remaining wraps in the data band are allocated to the data partition. In some approaches, all remaining wraps on the tape are allocated to the data partition. In one approach, when the drive writes an index file on the index partition, the process includes writing VOL1 Label and LTFS Label, followed by Index file from BOT.

Figures 13, 14:
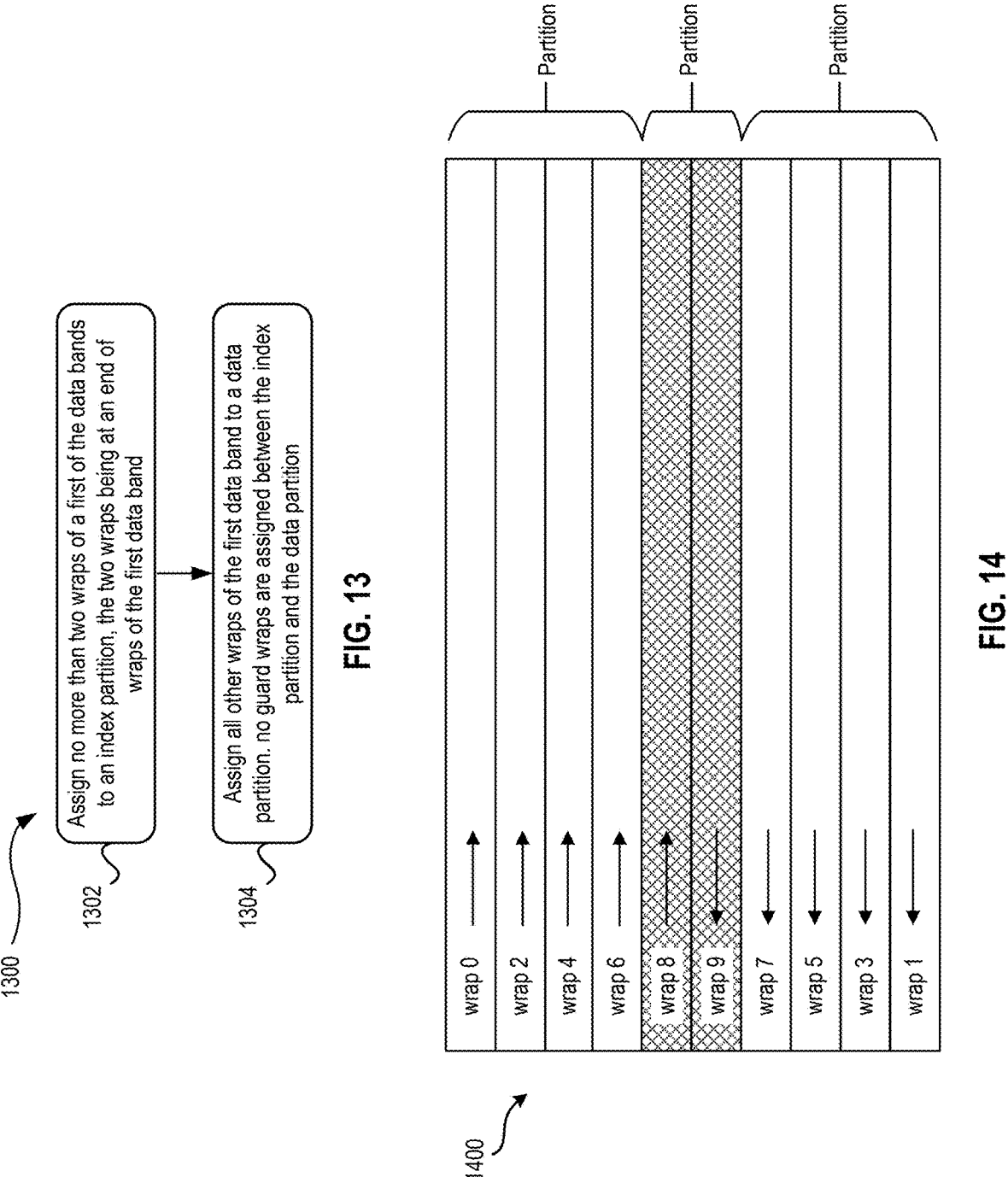
FIG. 13 is a flowchart of a method, in accordance with one embodiment.
FIG. 14 is a conceptual diagram illustrating an exemplary layout of wraps within a data band on a magnetic recording tape, in accordance with one embodiment.

Now referring to FIG. 13, a flowchart of a method 1300 is shown according to one embodiment. The method 1300 may be performed in accordance with the present invention in any of the environments depicted in FIGS. 1-12, among others, in various embodiments. Of course, more or fewer operations than those specifically described in FIG. 13 may be included in method 1300, as would be understood by one of skill in the art upon reading the present descriptions.

Each of the steps of the method 1300 may be performed by any suitable component of the operating environment. For example, in various embodiments, the method 1300 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 1300. Illustrative processors include, but are not limited to, a central processing unit (CPU), an application specific integrated circuit (ASIC), a field programmable gate array (FPGA), etc., combinations thereof, or any other suitable computing device known in the art.

The method 1300 includes partitioning a magnetic recording tape having a plurality of data bands, the partitioning including assigning no more than two wraps of a first of the data bands to an index partition, the two wraps being at an end of wraps of the first data band. See operation 1302. All other wraps of the first data band and all wraps of the other data bands are assigned to a data partition in operation 1304. Guard wraps between the index partition and the data partition are not assigned.

A preferred embodiment of the present method assigns two wraps which have the first and second largest wrap numbers among wraps of the arbitrary data band within four data bands to the index partition. In the example shown in FIG. 14, there are 10 wraps in data band 0 1400. The last two wraps, wrap 8 and wrap 9, are assigned to partition 1 and treated as an index partition for an index file. In prior partition mechanisms, it was necessary to assign guard wraps between partition 0 and partition 1. See, e.g., FIG. 11. However, the method proposed herein does not preserve any wraps for guard wraps, as shown in the layout 1400 of FIG. 14. From wrap 0 to wrap 7 and all remaining wraps later than wrap 10 (e.g., wraps in other data bands) are assigned to partition 0 and treated as being in the data partition.

The following description referred to LTFS as the file system used in various embodiments. Note that this has been done by way of example only, and that any suitable file system may be used in its place in any of the various embodiments described herein.

It is not typically necessary to update the index when merely reading files on the file system after mounting LTFS. However, once new files are written or any file attributes are changed, the index should be updated to reflect the new files and/or changes. The index file is preferably written to the index partition as part of unmounting the LTFS.

Figures 15A, 15B, 16:
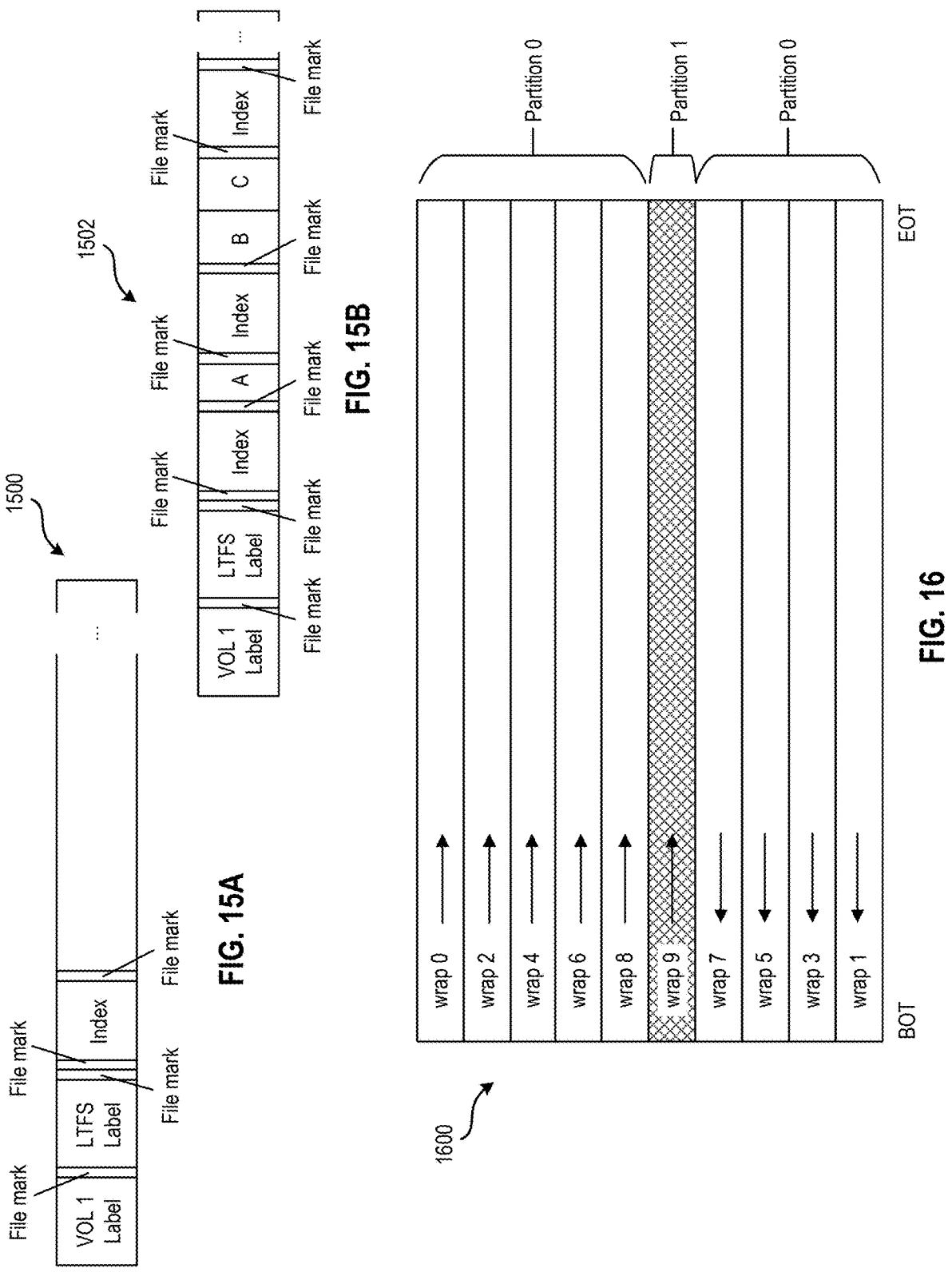
FIG. 15A is a conceptual diagram depicting an index partition, in accordance with one embodiment.
FIG. 15B is a conceptual diagram depicting a data partition, in accordance with one embodiment.
FIG. 16 is a conceptual diagram illustrating an exemplary layout of wraps within a data band on a magnetic recording tape, in accordance with one embodiment.

FIG. 15A illustrates, conceptually, an index partition 1500, in accordance with one embodiment. As shown, the following are written into the index partition: VOL1 Label, LTFS Label, followed by an index file. These items are written from the beginning of the index partition, preferably in a direction from BOT toward End of Tape (EOT). An index file is also preferably written to the data partition in response to the index being updated.

Referring again to FIG. 14, wrap 8 and wrap 9 in the index partition (Partition 1) are overwritten when data is written to wrap 6 or wrap 7 in data partition (Partition 0) due to the wide width of the writer, e.g., see FIG. 12. On the contrary, data on wraps in the data partition (Partition 0) of FIG. 14 are not overwritten despite data being written to wrap 8 and wrap 9 in the index partition.

FIG. 15B illustrates, conceptually, a data partition 1502, in accordance with one embodiment. As shown, LTFS specifies writing data of the file (A, B, C) in the data partition 1502, then writing a file mark, index file (Index), and a file mark (File Mark) at some interval, e.g., after a predefined amount of data is written, after one or more files are written, periodically such as every 5 minutes, etc. When a file is written to the data partition 1502, or an attribute of a file is changed, the meta data of the file system in the index partition becomes older and invalid. Accordingly, the latest index file is written to the index partition 1500 (FIG. 15A) before the file system is unmounted and the cartridge housing the magnetic recording tape is removed from the tape drive.

In some embodiments, using the layout 1400 shown in FIG. 14 as an example, when a tape volume is divided into two partitions, no data on the index partition (Partition 1) is overwritten while the tape drive merely reads files from the data partition (Partition 0), and the index file in the index partition retains valid meta data of the file system. On the other hand, once meta data of any files changes, or new files are written to the LTFS, new data is written to the data partition and the data in the wraps that are assigned to the index partition may be overwritten during the writing of the new data, e.g., because of the large width of the writer. Fortunately, this does not matter because the meta data recorded in the index file in the index partition has gotten older and is now invalid due to the addition of data, and the meta information therein will not be referred to any more at that time. When LTFS is unmounted, VOL1 Label and LTFS Label are written in the index partition, followed by an index file which contains the meta data of the latest file system from the beginning of the index partition to ensure that LTFS can mount the tape on the different tape drive.

In some embodiments, to increase the capacity of the data partition, only one last wrap of an arbitrary data band is assigned to the index partition, as depicted in the layout 1600 of FIG. 16. As shown, in this example 1600, the tape drive normally writes data on odd wraps from EOT to BOT. However, the present approach allows the tape drive to write data from BOT to EOT on odd wraps, e.g., see the arrow on wrap 9, depicting the direction of writing. Note that the tape drive's format and/or mechanical design changes may be made to enable such writing "in reverse." Accordingly, when writing data in Partition 1, the tape drive moves the head to the beginning of the wrap toward the BOT (in FIG. 6, on wrap 9). The head position to the direction of the tape width is the same as that of wrap n−1 in FIG. 10. When the tape drive writes data on wrap 9 of FIG. 16, it preferably uses the same read/write transducers as when the tape drive writes data on even wraps.

Figure 17:
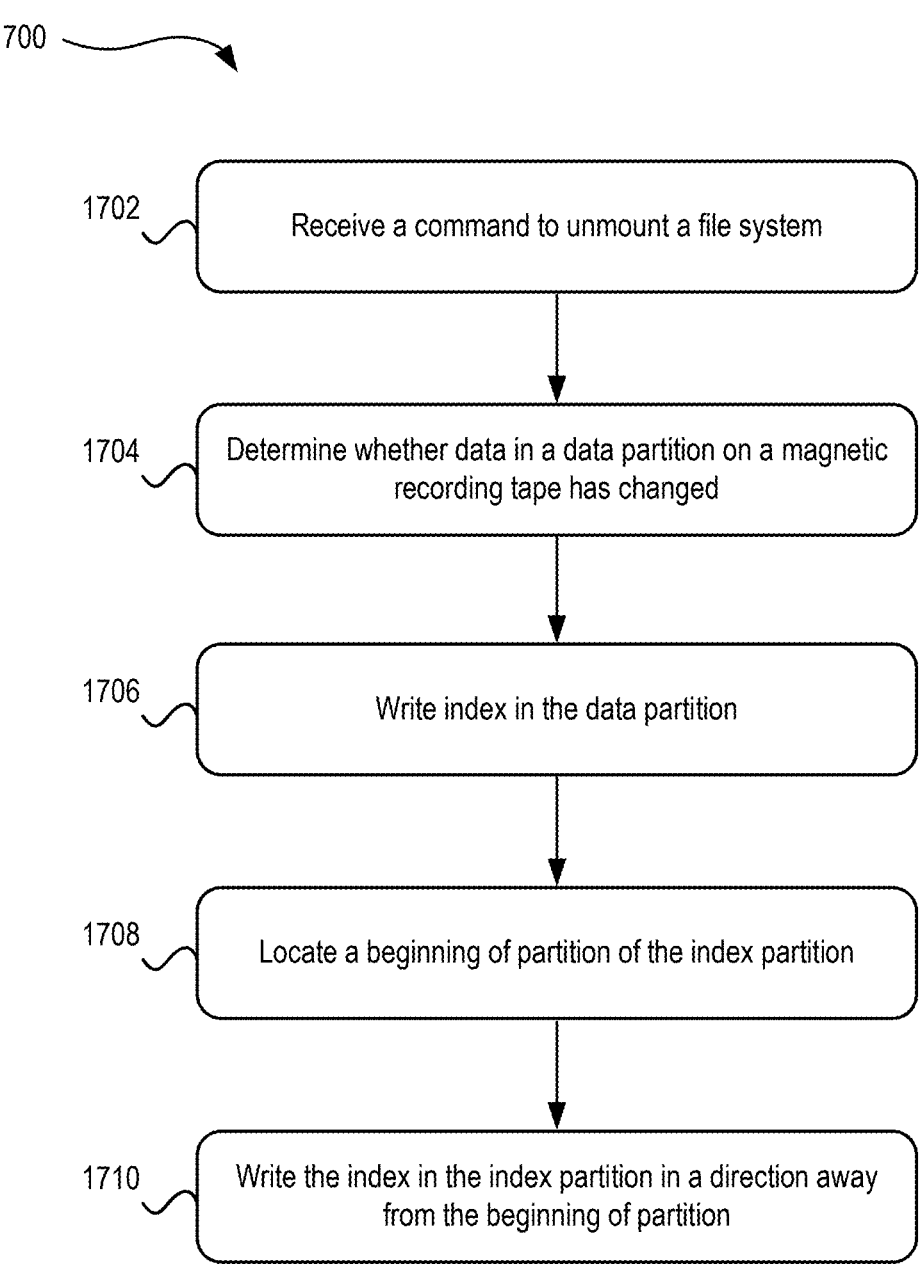
FIG. 17 is a flowchart of a method, in accordance with one embodiment.

Now referring to FIG. 17, a flowchart of a method 1700 to write an index file on the index partition is shown according to one embodiment. The method 1700 may be performed in accordance with the present invention in any of the environments depicted in FIGS. 1-16, 18 and/or 19, among others, in various embodiments. Of course, more or fewer operations than those specifically described in FIG. 17 may be included in method 1700, as would be understood by one of skill in the art upon reading the present descriptions.

Each of the operations of the method 1700 may be performed by any suitable component of the operating environment. For example, in various embodiments, the method 1700 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 1700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 17, method 1700 may initiate with operation 1702, where a command to unmount a file system is received. The command may come from a host, from the tape drive controller, etc. In some cases, a command from the host specifies that the tape is formatted as disclosed herein. In other approaches, whether the tape is partitioned with no guard wrap may be recorded in the cartridge memory. LTFS may retrieve the information from the tape drive by another command such as Mode Sense or the like. The tape may be one as described herein, in which no more than two wraps of a first data band are assigned to the index partition, the other wraps in the first data band are assigned to the data partition, and all wraps in other of the data bands are assigned to the data partition.

Note that commands may be used to specify that no more than two wraps of a first data band are assigned to the index partition. In one example, such commands may include a Mode Select command followed by a Format Medium command (or the like). A Mode Select command specifies how the tape is formatted. In this case, the tape is partitioned, one or two wraps are assigned to one partition and all remaining wraps are assigned to another partition. The fact that no guard wrap is assigned between partitions may be specified by the Mode Select command. The tape is divided into two partitions when the Format Medium command is issued.

In operation 1704, a determination is made as to whether data in a data partition on a magnetic recording tape has changed.

In operation 1706, in response to determining that the data has changed, an index is written in the data partition. If no data in the data partition has changed, no new index is written, as the existing index remains valid.

In operation 1708, a beginning of partition of the index partition is located.

In operation 1710, the index is written in the index partition in a direction away from the beginning of partition.

As noted above, preferred embodiments write a sequence of data such as VOL1 Label, LTFS Label and an index file from the beginning of partition (BOP). See, e.g., FIG. 15A. Writing of this information can be realized by either the file system (e.g., LTFS) side or the tape drive side.

Now referring to FIG. 18, a flowchart of a method 1800 for unmounting in LTFS when the index needs updating, as realized by the file system, is shown according to one embodiment. The method 1800 may be performed in accordance with the present invention in any of the environments depicted in FIGS. 1-17, among others, in various embodiments. Of course, more or fewer operations than those specifically described in FIG. 18 may be included in method 1800, as would be understood by one of skill in the art upon reading the present descriptions.

Each of the steps of the method 1800 may be performed by any suitable component of the operating environment. For example, in various embodiments, the method 1800 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 1800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 18, method 1800 may initiate with operation 1802, where a command is received to unmount the file system, which in this example is LTFS.

In operation 1804, LTFS checks whether it is necessary to update the index or not. If an update is required, the process proceeds to operation 1806, otherwise the process proceeds to operation 1816 to unload the tape.

In operation 1806, LTFS writes an index file at the end of the data partition.

In operation 1808, the tape drive moves to the BOP of the index partition.

In operation 1810, LTFS writes VOL1 Label, followed by a file mark, LTFS Label and a file mark.

If there are files which were specified by Rules of LTFS, LTFS writes these records to the tape. See operation 1812.

In operation 1814, LTFS writes a file mark, followed by an index file and a file mark.

In operation 1816, the tape drive unloads the cartridge.

The Rules files in operation 1812 may be defined in the LTFS specification to write data of specified files on the index partition as well because these files may be accessed immediately at the next LTFS mount. When LTFS mounts, these Rules files are read from the tape and stored on the disk or memory of the LTFS system. The files are written to the tape again when LTFS is unmounted.

FIG. 19 shows how data referred to in method 1800 may be written on the index partition 1900, in accordance with one embodiment.

Now referring to FIG. 20, a flowchart of a method 2000 for writing an index, as realized by a tape drive, is shown according to one embodiment. The method 2000 may be performed in accordance with the present invention in any of the environments depicted in FIGS. 1-19, among others, in various embodiments. Of course, more or fewer operations than those specifically described in FIG. 20 may be included in method 2000, as would be understood by one of skill in the art upon reading the present descriptions.

Each of the steps of the method 2000 may be performed by any suitable component of the operating environment. For example, in various embodiments, the method 2000 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 2000. Illustrative processors include, but are not limited to, a central processing unit (CPU), an application specific integrated circuit (ASIC), a field programmable gate array (FPGA), etc., combinations thereof, or any other suitable computing device known in the art.

In some embodiments, a tape drive employs a mechanism called BOP cache which stores data near the beginning of the tape to preserve this data for reading access to the records stored therein. One approach utilizes the BOP cache mechanism because VOL1 Label, LTFS Label and at least a part of the index file are stored in the BOP cache segment when LTFS is mounted.

When partitions are made as in FIG. 14 or 16, e.g., in response to a FORMAT MEDIUM command or the like, an indication that partitions are made by this mechanism is recorded in cartridge memory (CM), somewhere on the tape (e.g., in a header), from reading a bar code or RFID tag on a cartridge and retrieving the information from a database, etc. Assume, for the present example, the information about how the tape was partitioned is indicated in CM. The tape drive checks the information in CM when a tape is loaded so that it can determine whether the tape is formatted to LTFS using this mechanism or not.

As shown in FIG. 20, illustrative method 2000 for unmounting LTFS may initiate with operation 2002, where a command is received to unmount the file system, which in this example is LTFS.

In operation 2004, LTFS checks whether it is necessary to update index or not. If update is required, the process continues to operation 2006; otherwise the process proceeds to operation 2022 to unload the tape.

In operation 2006, LTFS writes an index file at the end of the data partition.

In operation 2008, LTFS issues LOCATE command or SPACE command to go to the second file mark location in index partition. The LOCATE command specified the absolute record/file mark number. The SPACE command specifies the relative record/file mark number. The tape drive utilizes BOP cache to move to the second file mark location on the BOP cache segment without tape motion.

In operation 2010, LTFS writes Ruled records and an index file to the tape drive.

The tape drive knows whether the data in the index partition was overwritten by the data written in data partition or not. See decision 2012. If the data in index partition was overwritten, the process continues to operation 2014; otherwise the process proceeds to operation 2024.

In operation 2014, the tape drive copies data from beginning of BOP cache segment until the second file mark to the other segments which are used for writing data to the tape from Seg #X to Seg #Y–1.

In operation 2016, the tape drive writes data written from the host like Ruled records and index file, followed by EOD to the beginning of the next segment Seg #Y. Here the segment EOD was written is Seg #Z.

In operation 2018, the tape drive moves to the BOP in the index partition.

In operation 2020, the tape drive writes data sets created in Seg #X, . . . , Seg #Z to the tape at current position (BOP). The tape is then unloaded. See operation 2022.

If the process proceeded to operation 2024 at decision 2012, the tape drive moves to the BOP of the index partition and reads data sets until the second file mark is found. Here these segments are Seg #S, . . . , Seg #T–1.

In operation 2026, new data written from the host like Ruled records and index file, followed by EOD are written to the beginning of the next segment Seg #T. Here the EOD segment is Seg #U. Now the current location on the tape is at the end of the data set which has the second file mark from BOP.

In operation 2028, the tape drive writes data sets created in Seg #T, . . . , Seg #U to the tape.

In operation 2022, the tape drive unloads the cartridge. The method 2000 preferably results in the same data being written in the index partition as in the example of FIG. 19 written during the method 1800 of FIG. 18.

In some cases, older tape drives may be operating with a prior version of LTFS. When the foregoing mechanism for unmounting LTFS is realized in LTFS as in the method of FIG. 18, drives using prior versions of LTFS may not know this mechanism. The legacy LTFS does not write VOL1 Label and LTFS Label on index partition when unmounting LTFS so that the tape which was formatted for this mechanism cannot be used. However, this problem may be solved in many ways, as would become apparent to one skilled in the art after reading the present disclosure. Several possible solutions are listed below.

In one approach, the LTFS that knows this mechanism makes the tape write protected using LTFS's Volume Advisory Locking feature when the file system is unmounted. The LTFS that does not know this mechanism is allowed to read files from the file system. The LTFS that knows this mechanism unlocks the Volume Advisory Locking when it mounts file system to write new files to the tape.

In another approach, a new command is defined for the tape drive, e.g., a new page in Mode Page. The LTFS that knows this mechanism makes the tape logical write protected using the command when the file system is unmounted. A new tag is defined in the LTFS index to identify that the tape was formatted by this mechanism. LTFS can determine whether the tape was formatted by this mechanism by checking the tag in the index while mounting the file system so that LTFS can unlock the logical write protection using the command noted above. The LTFS that does not know this mechanism accesses the file system as write protected. In this case, the tape drive may make the tape write protected when the tape is unloaded. The tape drive firmware which knows this mechanism determines whether the tape was formatted by this mechanism or not by checking CM to unlock the write protection. The tape drive firmware which does not support this mechanism can read files from the file system.

Various partitioning structures are also contemplated, in accordance with various embodiments. For example, no more than two wraps of a different data band may be assigned to the index partition, the two wraps being at an end of wraps of the different data band.

In one approach, assume a tape drive has recorded the first and last wrap number that make up the partition in CM. That is, from the first wrap to the last wrap, the wrap numbers are contiguous. Accordingly, using the layout of FIG. 10 as an example, the first wrap may be on data band 0, while the last wrap may be on data band 3. There are variety of methods to allocate wraps to a partition that would become apparent to one skilled in the art after reading the present disclosure, any of which may be used in various embodiments. One of the simplest ways is to generate a list of all of the wraps which belong to the partition.

Referring again to FIGS. 10 and 13, continuing with the example from the previous paragraph, in order to keep all wrap numbers contiguous, the last wrap or last two wraps in the layout are allocated to the index partition, and all other wraps are allocated to the data partition. The last wrap or last two wraps would be in data band 3, and thus the index partition will be located in data band 3.

In order to reduce the time to locate data band 3, the index partition may be moved to another data band, such as data band 0. Because it may take several seconds to move to data band 3, having the index partition in data band 0 may reduce the time required to begin reading the index partition. In one approach, the last two wraps of the data band 0 can be allocated to the index partition, e.g., as in FIG. 13. Note that the format of the tape drive operating on the tape may be modified to allow discontinuous wrap numbers in a partition, if such feature is not allowed by default.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
partitioning a magnetic recording tape having a plurality of data bands, the partitioning comprising:
assigning no more than one wrap of a first of the data bands to an index partition, the one wrap being at an end of wraps of the first data band, and assigning all other wraps of the first data band to a data partition,
wherein no guard wraps between the index partition and the data partition are assigned.

2. The method of claim 1, wherein all wraps on the magnetic recording tape, other than the one wrap assigned to the index partition, are assigned to the data partition.

3. The method of claim 1, further comprising writing an index file to the index partition from a beginning position of the index partition at a beginning of tape.

4. The method of claim 1, further comprising overwriting at least a portion of the index partition while writing data in the data partition; and thereafter writing a new index to the index partition.

5. The method of claim 1, wherein only the one wrap of the first data band holds the index for data on all of the data bands on the magnetic recording tape.

6. The method of claim 1, wherein odd ones of the wraps of the first data band are written from end of tape to beginning of tape and even ones of the wraps of the first data band are written from beginning of tape to end of tape, wherein the one wrap assigned to the index partition is on an odd wrap; and further comprising writing an index in the index partition in a direction from beginning of tape to end of tape.

7. The method of claim 1, wherein the method is realized by a file system.

8. The method of claim 1, wherein the method is realized by a tape drive.

9. The method of claim 8, wherein the tape drive determines, from information stored in cartridge memory and/or on the tape, that the tape has been partitioned according to the method.

10. The method of claim 1, wherein wrap numbers of all of the wraps on the tape are contiguous, wherein the one wrap assigned to the index partition is the last one wrap on the tape.

11. The method of claim 1, wherein wrap numbers of all of the wraps on the tape are contiguous, wherein the one wrap assigned to the index partition is not the last wrap on the tape, wherein a tape drive operating on the tape is configured to allow discontinuous wrap numbers in the data partition.

12. An apparatus, comprising:
a magnetic head;
a drive mechanism for passing a magnetic recording tape over the magnetic head; and
a controller electrically coupled to the magnetic head, the controller being configured to cause the apparatus to perform operations comprising:
partitioning a magnetic recording tape having a plurality of data bands, the partitioning comprising:
assigning no more than two wraps of a first of the data bands to an index partition, the two wraps being at an end of wraps of the first data band, and
assigning all other wraps of the first data band to a data partition,
wherein no guard wraps are assigned between the index partition and the data partition,
wherein all wraps on the magnetic recording tape, other than the wraps assigned to the index partition, are assigned to the data partition.

13. The apparatus of claim 12, the operations further comprising writing an index file to the index partition from a beginning position of the index partition at a beginning of tape.

14. The apparatus of claim 12, the operations further comprising overwriting at least a portion of the index partition while writing data in the data partition; and thereafter writing a new index to the index partition.

15. The apparatus of claim 12, wherein only one wrap of the first data band is assigned to the index partition.

16. The apparatus of claim 12, the operations further comprising determining, from information stored in cartridge memory and/or on the tape, that the tape has been partitioned according to the method partitioning.

17. The apparatus of claim 12, wherein the data bands are configured to have multiple physical wraps in the corresponding data band; wherein operations include assigning all of the physical wraps of the data bands, other than the wraps assigned to the index partition in the first data band, to the data partition; wherein the index partition in the first data band holds the index for all data in the data partition.

18. A method comprising:

receiving a command to unmount a file system used with a magnetic recording tape having no guard wraps between an index partition and a data partition on a magnetic recording tape;

determining whether data in the data partition has changed;

in response to determining that the data has changed, writing an index in the data partition;

locating a beginning of partition of the index partition; and writing the index in the index partition in a direction away from the beginning of partition, wherein no more than one wrap is assigned to the index partition.

19. The method of claim 18, wherein the file system specifies that no more than the one wrap is assigned to the index partition, wherein all wraps in data bands other than a data band having the one wrap are assigned to the data partition.

20. The method of claim 18, wherein wrap numbers of all of the wraps on the tape are contiguous, wherein the wrap assigned to the index partition is not the last two wrap on the tape, wherein a tape drive operating on the tape is configured to allow discontinuous wrap numbers in the data partition.

* * * * *